United States Patent

Cheswick et al.

Patent Number: 6,053,985
Date of Patent: Apr. 25, 2000

[54] METHOD OF CLEANING OPTICAL FIBERS AND CONNECTORS AND APPARATUS USED THEREFOR

[76] Inventors: Alfred J. Cheswick, 104 Ocean Ave., Loch Arbour, N.J. 07711; Cuneyt Erdogan, 25 Magellan Way, Franklin Park, N.J. 08823

[21] Appl. No.: 08/989,951

[22] Filed: Dec. 12, 1997

[51] Int. Cl.[7] .............................. A47L 13/10; B08B 7/00

[52] U.S. Cl. ..................... 134/6; 15/104.002; 15/210.1; 134/42

[58] Field of Search .................. 134/6, 42; 15/104.002, 15/210.1, 218, 218.1

[56] References Cited

U.S. PATENT DOCUMENTS

| | | | |
|---|---|---|---|
| 5,117,528 | 6/1992 | Kanayama et al. | 15/210 R |
| 5,690,749 | 11/1997 | Lee | 134/6 |
| 5,836,031 | 11/1998 | Cox | 15/104.002 |

*Primary Examiner*—Zeinab El-Arini

[57] ABSTRACT

An optical fiber and optical connector cleaning device which removes contaminants and particulants from fiber end face surfaces. The device consists of a surface treated with a high bonding adhesive. A template with a plurality of alignment holes is positioned upon the adhesive surface. A fiber connector with contaminants residing upon its fiber surface is guided by a template hole and makes contact with the adhesive surface. After connector disengagement, contaminants remain bonded to the adhesive surface resulting in a contaminant-free optical fiber and optical connector.

4 Claims, 6 Drawing Sheets

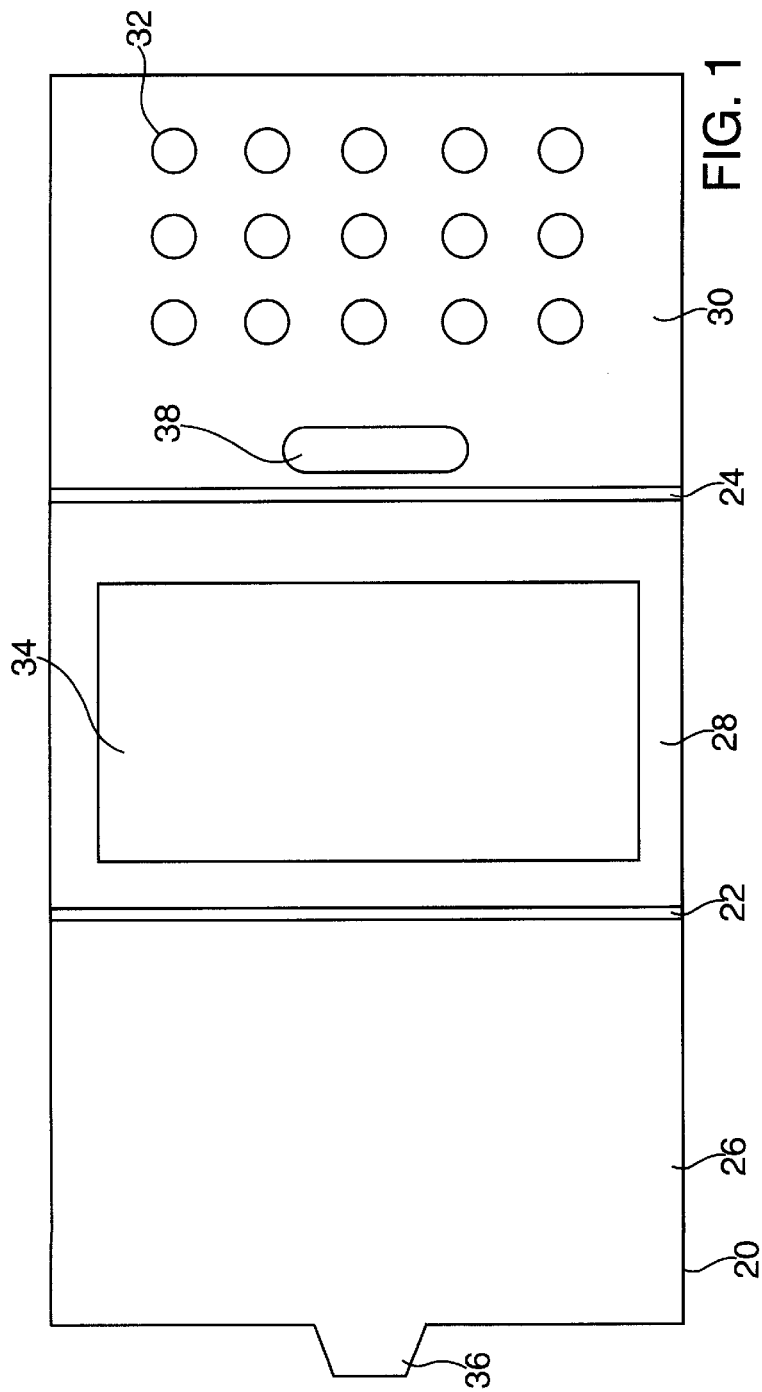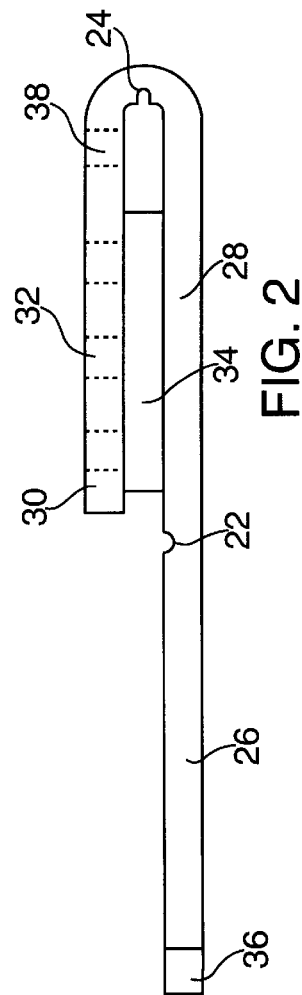

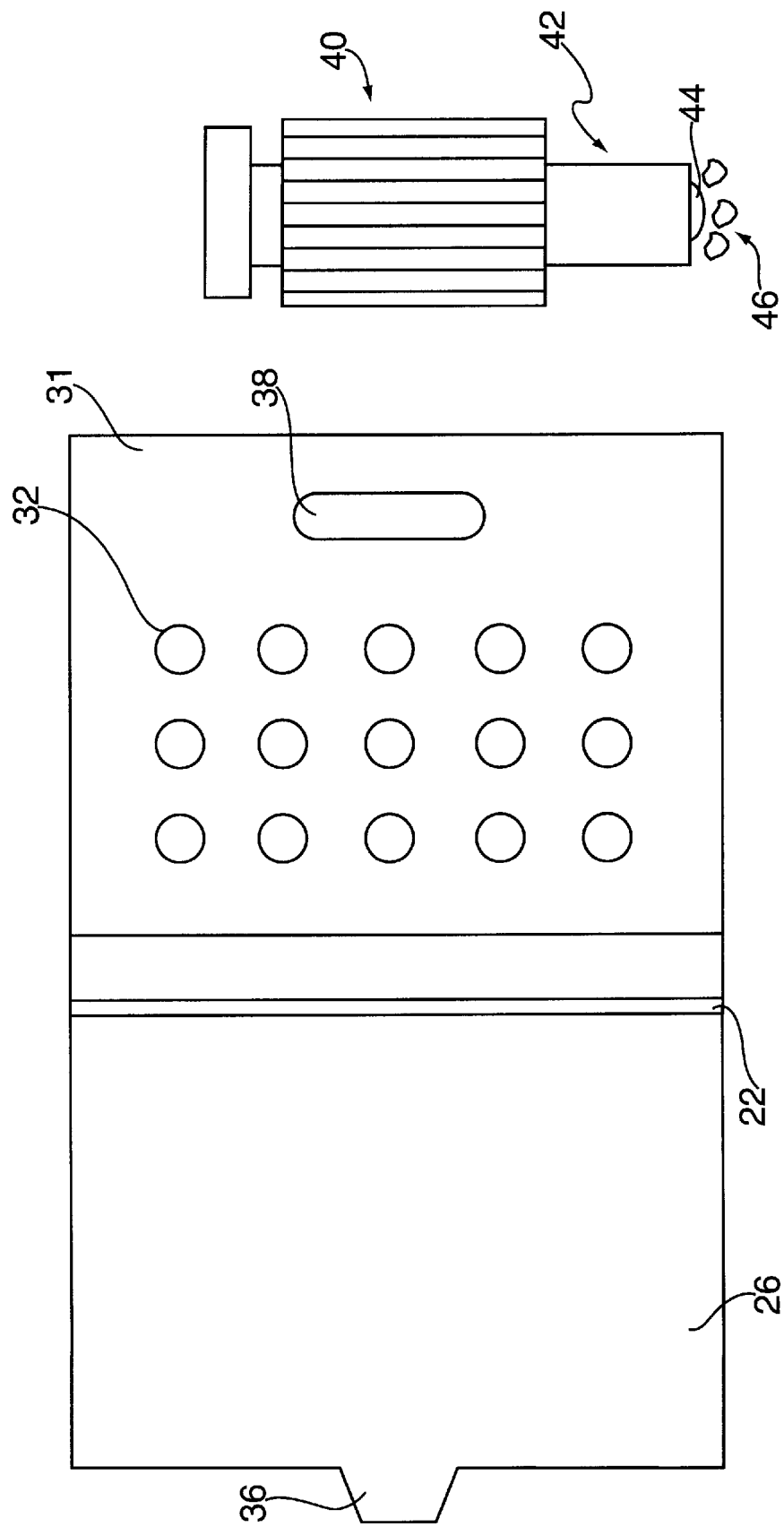

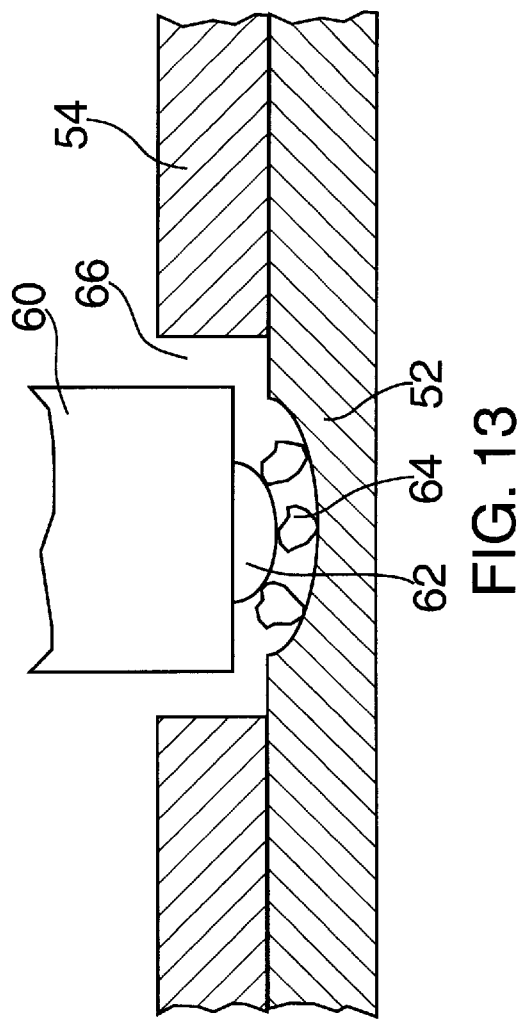
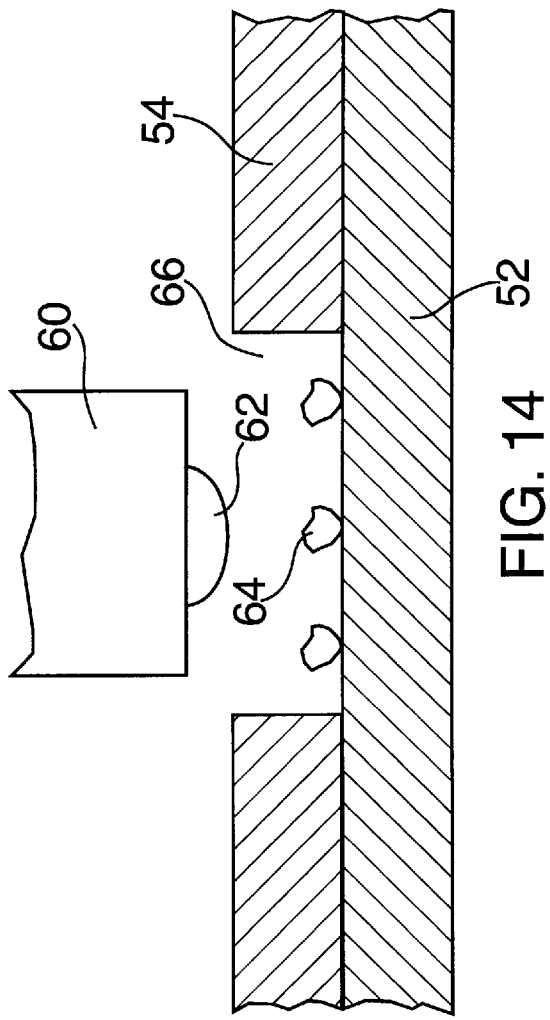
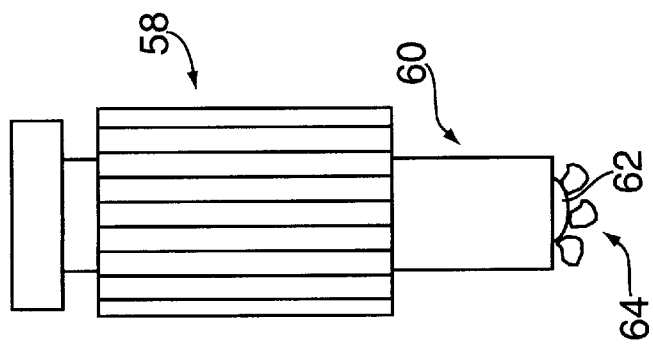

METHOD OF CLEANING OPTICAL FIBERS AND CONNECTORS AND APPARATUS USED THEREFOR

FIELD OF THE INVENTION

The present invention generally relates to a method and to devices used to clean optical fibers, and more particularly relates to apparatuses and procedures which remove contaminants from optic fiber and optical connector end faces.

BACKGROUND OF THE INVENTION

Optical connectors have many applications in fiber optic networks. Their ability to be mated and unmated lend flexibility for transmission routing. Optical connectors can link individual fiber segments together to achieve longer distances. Connectors permit access to terminal transmission equipment. Fiber cable assemblies are terminated with connectors for patching between equipment. Connectors are mounted on fiber test instrumentation for fiber measurement purposes.

Fiber connectors consist of a male ferrule in which a fiber is inserted and mounted. The end face of the fiber protruding from the tip of the ferrule must be polished to create a scratch-free surface. This will maximize light transmission when one connector is mated to another by means of a female coupler.

Light travels through the core of an optical fiber. The core diameter of a standard telecommunication fibers ranges from approximately 9 microns to 100 microns. The size of dust and ambient particulants average between several microns to over 50 microns. If these potential contaminants are present on the polished fiber core, they can obstruct light transmission and create connector loss.

Many modern connectors are polished so that the fiber has a convex curvature and slightly protrudes above the ferrule end face. When two connectors are mated by a female coupler, the two polished fiber surfaces touch and deform each other. This contact is often desired to reduce attenuation and optical back reflection.

The presence of contaminants between contacting fiber core surfaces can be extremely hazardous. These contaminants can easily scratch and pit the polished fiber surfaces. This is especially true during the initial mating when the two ferrules often rotate against each other.

Several methods are currently used to clean fiber surfaces before mating connectors.

Compressed air is sprayed across the ferrule to blow contaminants off the fiber surface. The force is not always sufficient to be effective. This is especially true when using costly self-contained air cans. Additionally, the compressed air propellant can also contaminate the fiber surface.

Lint-free cloths are wiped across the ferrule end face to remove contaminants. These clothes, while manufactured to be "lint-free", can still leave behind material. Additionally, the wiping action can scrape contaminants across the fiber surface.

Often cloths are treated with cleaning agents, such as isopropyl alcohol, to aid in the cleaning process. The effectiveness is highly dependent upon the purity of The agent. Impure agents can leave loss inducing residues on the fiber surface. After application of cleaning agent, compressed air often needs to be applied to evaporate the agent. Local, state and federal codes restrict the use and transport of some of these agents due to their flammability and combustible properties.

Fibers are also wiped against polyester tapes contained in dispensers. As with lint-free cloths, the wiping action can also cause scratches on the fiber surface. Dispensers are often costly to distribute when many users are required.

SUMMARY OF THE INVENTION

Therefore it is an object of the invention to provide a safe and effective means of cleaning optical fibers and optical connectors.

An advantage of the present invention is that it cleans particulants and contaminants from a fiber optic connector when depressed against the polished fiber surface.

Another advantage of the present invention is that it removes contaminants from the end face of an optical connector without the need of a wiping action. This eliminates the possibility of scratching particulants across the polished fiber surface.

Still another advantage of the present invention is that it does not require the application of a cleaning solution or agent.

A further advantage of the present invention is that it does not require a special dispenser.

An additional advantage of the present invention is that it can be operated with a single hand.

It is still another advantage of the present invention that it does not leave any loss inducing residue on the fiber surface.

An additional advantage of the present invention is that its application does not require compressed air.

Other advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention.

FIG. 1 is a top view of the preferred embodiment illustrating the open base structure with cleaning means positioned.

FIG. 2 is a side view of the base structure with one section closed over the cleaning means.

FIG. 5 is a top view of the preferred embodiment with one section unfolded exposing the plurality of holes.

FIG. 6 is a optical connector with contaminants on the surface of its ferrule and optical fiber.

FIG. 12 is a optical connector with contaminants on the surface of its ferrule and optical fiber.

FIG. 13 demonstrates the engagement of a optical connector ferrule with the cleaning means of the embodiment of FIG. 9.

FIG. 14 demonstrates the disengagement of a optical connector from the cleaning means of the embodiment of FIG. 9.

DETAILED DESCRIPTION OF THE PREFERRED EMBODIMENT

Figure 3:
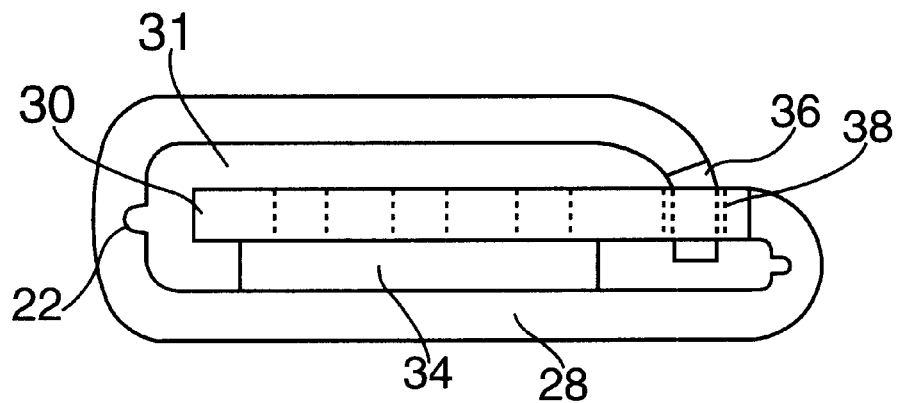
FIG. 3 is a side view of the preferred embodiment with two sections of the base structure folded over the cleaning means. The interlocking of the tab and slit is illustrated.

Referring to FIG. 1, apparatus 1 is provided with a base structure 20. Base structure 20 is a flat, rectangular and foldable body of material formed with a tab 36. Suitable materials for base structure 20 include paperboard, cardboard, vinyl, polymer plastics nylon, rubber, leather, paper, and acetate. Paperboard is preferred. Base structure 20 has a thickness of approximately 0.005 inch to 0.125 inch.

Two score marks 22 and 24 traverse the length of base structure 20. Score marks 22 and 24 partition base structure 20 into a section 26, 28 and 30. Sections 26, 28. and 30 have approximately equal surface areas. Tab 36 is formed on the outer edge of section 26.

A cleaning means 34. is positioned upon the surface of section 28. Suitable cleaning means include adhesive tapes such as the double-sided adhesive tape with product number 4950 supplied by 3M. Inc., St. Paul. Minn. described in "3M VHB™ Tapes-Very High Bond" product catalog dated 1994, page 8. Cleaning means 34 is positioned and bonded to section 28 so as to be approximately centered upon the surface of section 28. Suitable bonding techniques include epoxy glue and self-adhesion of cleaning means 34. Self-adhesion is preferred.

A slit 38 is formed through the inner area of section 30. The length of slit 38 is greater than or equal to the length of the base of tab 36. The width of slit 38 is greater than the thickness of base structure 20. A plurality of holes 32 are formed through section 30 of base structure 20. The plurality of holes 32 have diameters of approximately 2 millimeters to 10 millimeters.

Referring to FIG. 2, the plurality of holes 32 are positioned such that when section 30 is folded at score mark 24 back over section 28 the plurality of holes 32 are centered upon cleaning means 34. The position of slit 38 is such that when section 30 is folded over cleaning means 34 slit 38 is not centered over cleaning means 34.

Referring next to FIG. 3, score mark 22 and tab 36 are positioned so that when section 26 is folded at score mark 22 back upon a rear surface 31 of section 30, tab 36 can be inserted into slit 38.

Figure 4:
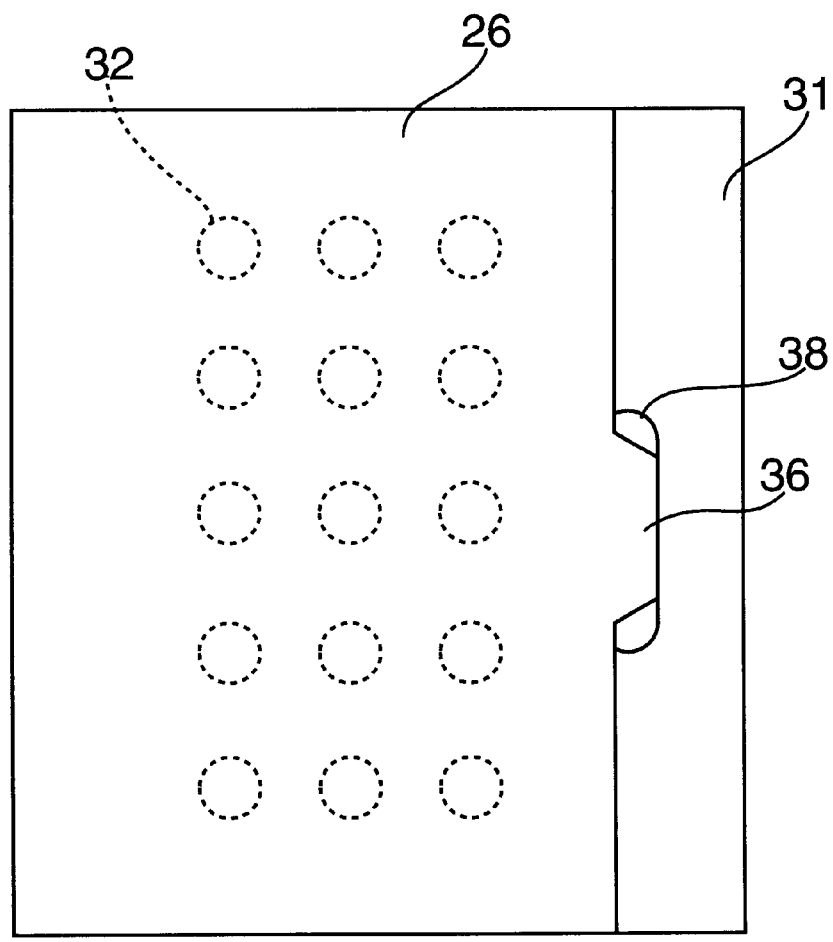
FIG. 4 is a top view of the base structure with one section of the base structure covering the plurality of holes. The interlocking of the tab and slit is illustrated.

Referring now to FIG. 4, section 26 covers the plurality of holes 32 when tab 36 is inserted into slit 38.

The operation of apparatus 1 will now be described. Referring to FIG. 5, tab 36 disengages from slit 38. Section 26 is unfolded at score mark 22 exposing the plurality of holes 32.

Referring now to FIG. 6, an optical connector 40 is comprised of a ferrule 42. An optical fiber 44 is mounted within ferrule 42. Contaminant particles 46 reside upon the end face surface of optical fiber 44 and ferrule 42.

Figure 7:
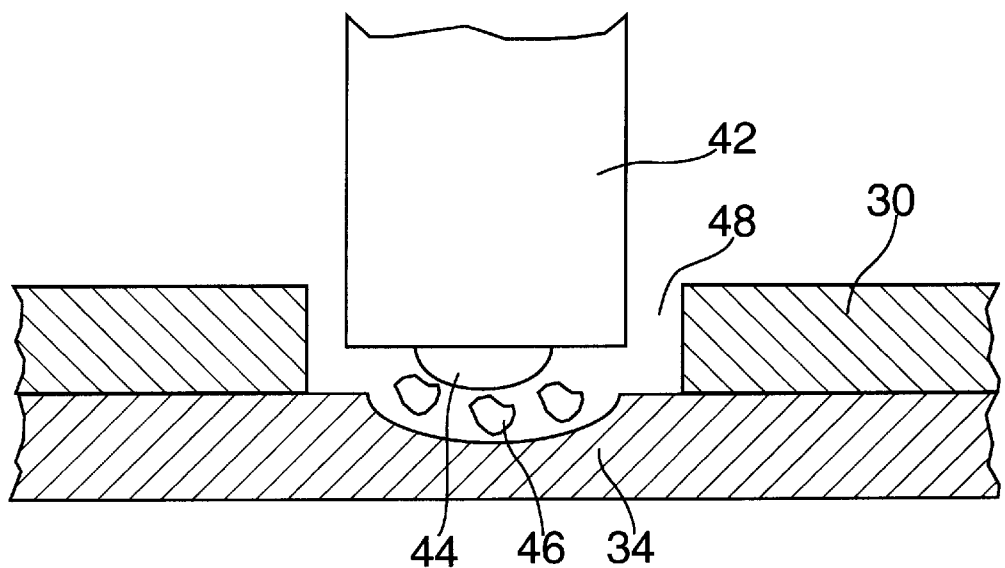
FIG. 7 demonstrates the engagement of a optical connector ferrule with the preferred embodiment's cleaning means.

Referring to FIG. 7, ferrule 42 is inserted into a hole 48 of the plurality of holes 32. The end face surfaces of ferrule 42 and optical fiber 44 make contact with cleaning means 34 and compress cleaning means 34. As ferrule 42 and optical fiber 44 contact cleaning means 34 contaminant particles 46 contact cleaning means 34.

Figure 8:
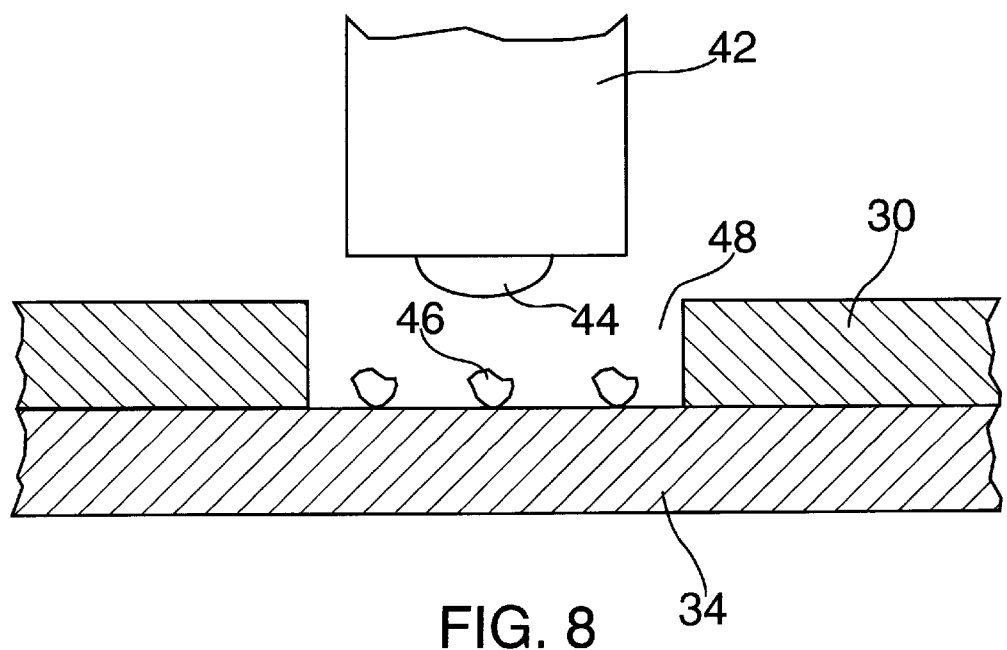
FIG. 8 demonstrates the disengagement of a optical connector ferrule with the preferred embodiment's cleaning means.

Referring now to FIG. 8, when ferrule 42 is removed, contaminant particles 46 remain bonded to the cleaning means 34. This results in a contaminant-free ferrule 42 and optical fiber 44.

Figure 9:
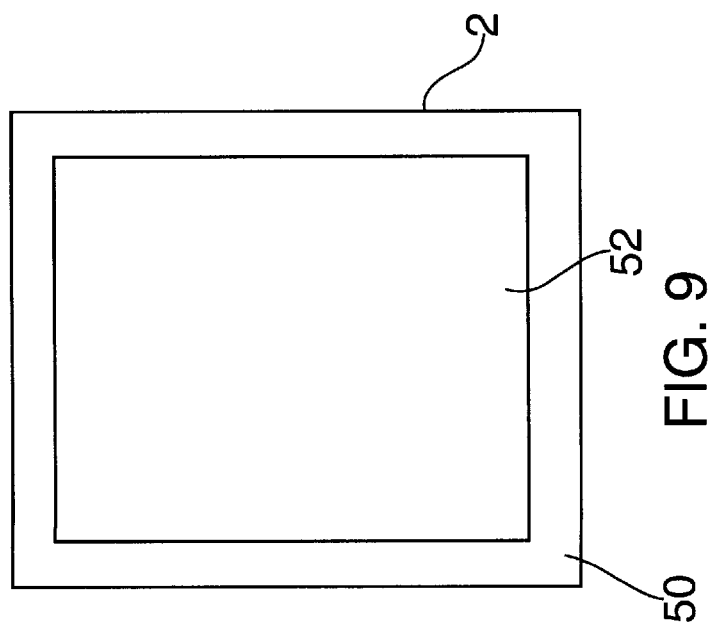
FIG. 9 is a top view of another embodiment of the present invention with the cleaning means positioned on the base structure.

In another embodiment of the present invention, apparatus 2 is represented in FIG. 9. Apparatus 2 is provided with a base structure 50. Base structure 50 is a flat body of material. Suitable materials include paperboard, cardboard, vinyl, polymer plastics, nylon, rubber, leather, paper, and acetate. Paperboard is preferred. A cleaning means 52 is positioned and bonded upon the surface of base structure 50. Suitable cleaning means include adhesive tapes such as the double-sided adhesive tape with product number 4950 supplied by 3M. Inc., St. Paul, Minn., described in "3M VHB™ Tapes-Very High Bond" product catalog dated 1994, page 8. Suitable bonding techniques include epoxy, glue and self-adhesion of cleaning means 52. Self-adhesion is preferred.

Figure 10:
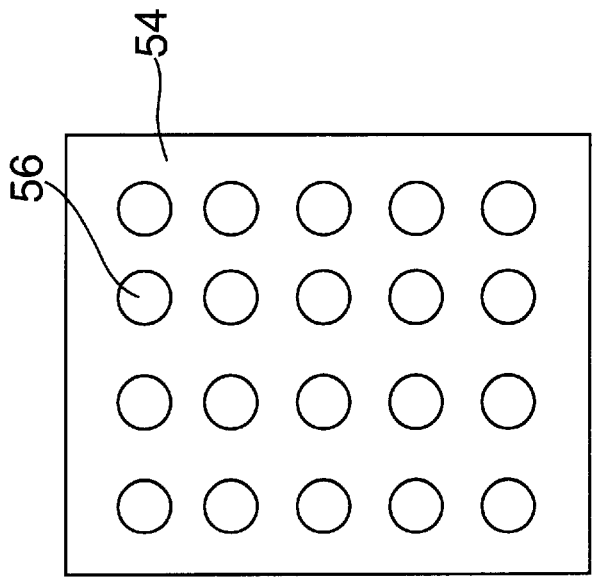
FIG. 10 is a top view of a template of the embodiment of FIG. 9.

Referring now to FIG. 10, a template 54 comprises a flat body of material. Suitable materials include paperboard, cardboard, vinyl, polymer plastics, nylon, rubber, leather, paper, and acetate. Paperboard is preferred. A plurality of holes 56 are formed through template 54. The plurality of holes 56 have diameters of approximately 2 millimeters to 10 millimeters.

Figure 11:
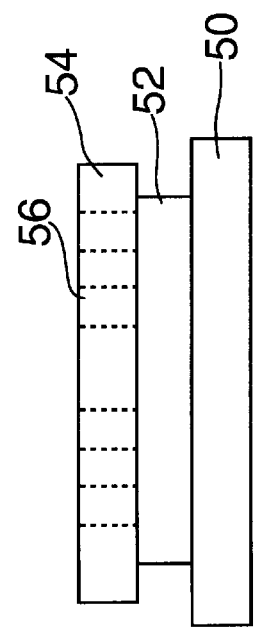
FIG. 11 is a side view of the embodiment of FIG. 9 with the template of FIG. 10 positioned upon the cleaning means.

Referring to FIG. 11, template 54 is positioned and bonded to the adhesive surface of cleaning means 52.

The operation of apparatus 2 will now be described. Referring now to FIG. 12, an optical connector 58 is comprised of a ferrule 60. An optical fiber 62 is mounted within ferrule 60. Contaminant particles 64 reside upon the end face surface of optical fiber 62 and ferrule 60.

Referring to FIG. 13, ferrule 60 is inserted into a hole 66 of the plurality of holes 56. The end face surfaces of ferrule 60 and optical fiber 62 make contact with cleaning means 52 and compress cleaning means 52. As ferrule 60 and optical fiber 62 contact cleaning means 52, contaminant particles 64 contact cleaning means 52.

Referring now to FIG. 14, when ferrule 60 is removed, contaminant particles 64 remain bonded to the cleaning means 52. This results in a contaminant-free ferrule 60 and optical fiber 62.

We claim:

1. An apparatus for a removal of contaminants and particulants residing on an end face of an optical fiber and an optical connector comprising:

a flexible base structure, said base structure partitioned into sections, an adhesive cleaning means disposed on a first section, a plurality of holes formed in a second section for receiving said fiber and said connector, said second section folded back over said first section; and a third section folded back over said second section.

2. The apparatus of claim 1 wherein said adhesive cleaning means is an adhesive tape.

3. The apparatus of claim 1 wherein said third section is formed with a tab.

4. A method of removing contaminants and particulants from an optical fiber and an optical connector, the method comprising the steps of:

providing a cleaning apparatus comprising a flexible base structure, said base structure partitioned into sections, an adhesive cleaning means disposed on a first section, a plurality of holes formed in a second section for receiving said fiber and said connector, said second section folded back over said first section;

providing said optical fiber and said optical connector having contact with said contaminants and said particulants;

inserting said optical fiber and said optical connector into said cleaning apparatus;

engaging said optical fiber and said optical connector with said adhesive cleaning means; and removing said optical fiber and said optical connector from said adhesive cleaning means, such that said contaminants and said particulants remain adhered to said cleaning means.

* * * * *